United States Patent
Byrne

(10) Patent No.: US 11,456,918 B2
(45) Date of Patent: Sep. 27, 2022

(54) CLIENT DRIVEN NETWORK CONFIGURATION

(71) Applicant: T-Mobile USA, Inc., Bellevue, WA (US)

(72) Inventor: Cameron Byrne, Seattle, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 27 days.

(21) Appl. No.: 16/903,720

(22) Filed: Jun. 17, 2020

(65) Prior Publication Data

US 2021/0399950 A1 Dec. 23, 2021

(51) Int. Cl.
*H04L 12/24* (2006.01)
*H04L 41/084* (2022.01)
*G06N 5/00* (2006.01)
*H04L 61/5014* (2022.01)
*H04L 67/52* (2022.01)

(52) U.S. Cl.
CPC ......... *H04L 41/0843* (2013.01); *G06N 5/003* (2013.01); *H04L 61/5014* (2022.05); *H04L 67/52* (2022.05)

(58) Field of Classification Search
CPC . H04L 41/0843; H04L 67/18; H04L 61/2015; G06N 5/003
See application file for complete search history.

(56) References Cited

U.S. PATENT DOCUMENTS

| | | | | |
|---|---|---|---|---|
| 2014/0351433 | A1* | 11/2014 | Sung | H04L 69/162 709/225 |
| 2015/0222592 | A1* | 8/2015 | Andrews | H04L 43/08 709/221 |
| 2016/0098336 | A1* | 4/2016 | Loebig | G06F 13/10 710/16 |

OTHER PUBLICATIONS

Author Unknown, "Network configuration," https://wiki.debian.org/NetworkConfiguration, 20 pages, May 22, 2020.
Muehlfeld et al., "3.3: Configuring IP Networking with NMCLI," Networking Guide, Red Hat Enterprise Linux 7, https://access.redhat.com/documentation/en-us/red_hat_enterprise_linux/7/html/networking_guide/sec-configuring_ip_networking_with_nmcli, 16 pages, 2019.

* cited by examiner

*Primary Examiner* — Kim T Nguyen
(74) *Attorney, Agent, or Firm* — Brownstein Hyatt Farber Schreck, LLP

(57) ABSTRACT

A network device includes a housing, a plurality of ports mounted to the housing, at least one switch mounted to the housing and configured to provide switchable connections between ports in the plurality of ports, and a processing system. Each port has a physical port type, and each port is configured to connect to a type of network cable supported by the physical port type. The processing system is configured to determine, at least partly from a set of network packets received via a port of the plurality of ports, a set of parameters of a client device. The processing system is further configured to align a network configuration used for the client device with the set of parameters of the client device.

19 Claims, 3 Drawing Sheets

CLIENT DRIVEN NETWORK CONFIGURATION

FIELD

Embodiments described herein relate to configuring a network so that a client device (e.g., a server or other network-connected computer) may communicate with other devices over the network. More particularly, described embodiments relate to aligning a network configuration with a client device.

BACKGROUND

Setting up and configuring Internet Protocol (IP) and Ethernet networks is complex, time-consuming, and manual in nature. For example, in an enterprise setting, such as a data center or office, a member of a hardware deployment team may select a new server having various hardware-related parameters, such as a 10 Gigabit Ethernet (10-GbE) single-mode optical fiber (SMF) network communications interface. A member of a server administration team may configure the server with an IP address and/or other soft, logical, or virtual parameters. A member of a cabling team may physically connect the server to a network switch or other device using a network cable, which cable may have a set of parameters. A member of a network configuration team may review all of the server's hardware, software, environmental, and/or other parameters and configure the network to align with the server (e.g., the network configuration has to be configured with an IP address that is consistent with the IP address of the server).

SUMMARY

This summary is provided to introduce a selection of concepts, in simplified form, that are further described in other sections. This summary is not intended to identify key features or essential features of the claimed subject matter, nor is it intended to be used as an aid in determining the scope of the claimed subject matter.

Described herein are unique systems, methods, devices, and apparatus that enable a network configuration to be automatically aligned with a client device. The automatic alignment (or self-alignment) may be achieved, in some cases, by a network device parsing communications (e.g., network packets) received via a port of a network device (e.g., via a port of a network switch) to determine a set of parameters of the client device. Parameters of the client device may also be determined by sensing aspects of the hardware that connects the client device to the network device, from responses to test signals or communications transmitted to the client device via the port, and so on.

More specifically, a network device is disclosed. The network device may include a housing, a plurality of ports mounted to the housing, at least one switch mounted to the housing and configured to provide switchable connections between ports in the plurality of ports, and a processing system. Each port may have a physical port type, and each port may be configured to connect to a type of network cable supported by the physical port type. The processing system may be configured to determine, at least partly from a set of network packets received via a port of the plurality of ports, a set of parameters of a client device. The set of parameters may include the physical port type of the port via which the set of network packets is received; a type of network cable connected to the port and sensed by the network device; and an IP address included in a Dynamic Host Configuration Protocol (DHCP) request of the client device, the DHCP request included in the set of network packets. The processing system may be further configured to align a network configuration used for the client device with the set of parameters of the client device.

Another network device is also disclosed. The network device may include a plurality of physical ports and a processor. The processor may be configured to receive, via a physical port in the plurality of physical ports, a set of communications from a client device connected to the physical port. The processor may also be configured to determine, at least in part from the set of communications, a set of parameters of the client device, and align a network configuration used for the client device with the set of parameters of the client device.

A method of aligning a network configuration to a set of parameters of a client device is also disclosed. The method may include receiving, from the client device and through a physical port of a network device, a set of communications transmitted by the client device; determining, at least in part from the set of communications, the set of parameters of the set of communications; and aligning the network configuration with the set of parameters.

BRIEF DESCRIPTION OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The alignment of a network configuration to a client device (e.g., a server or other computer) is a manual and time-consuming process. The process is manual in that someone has to type parameters of the client device into various fields of an input screen. Automatic alignment of a network configuration, as described herein, can reduce the time and resources needed to align a network configuration with a client device. In some cases, a processing system associated with a network device may achieve automatic alignment of a network configuration, to a client device, using one or more of policies, templates, hints, or heuristics.

Figure 1:
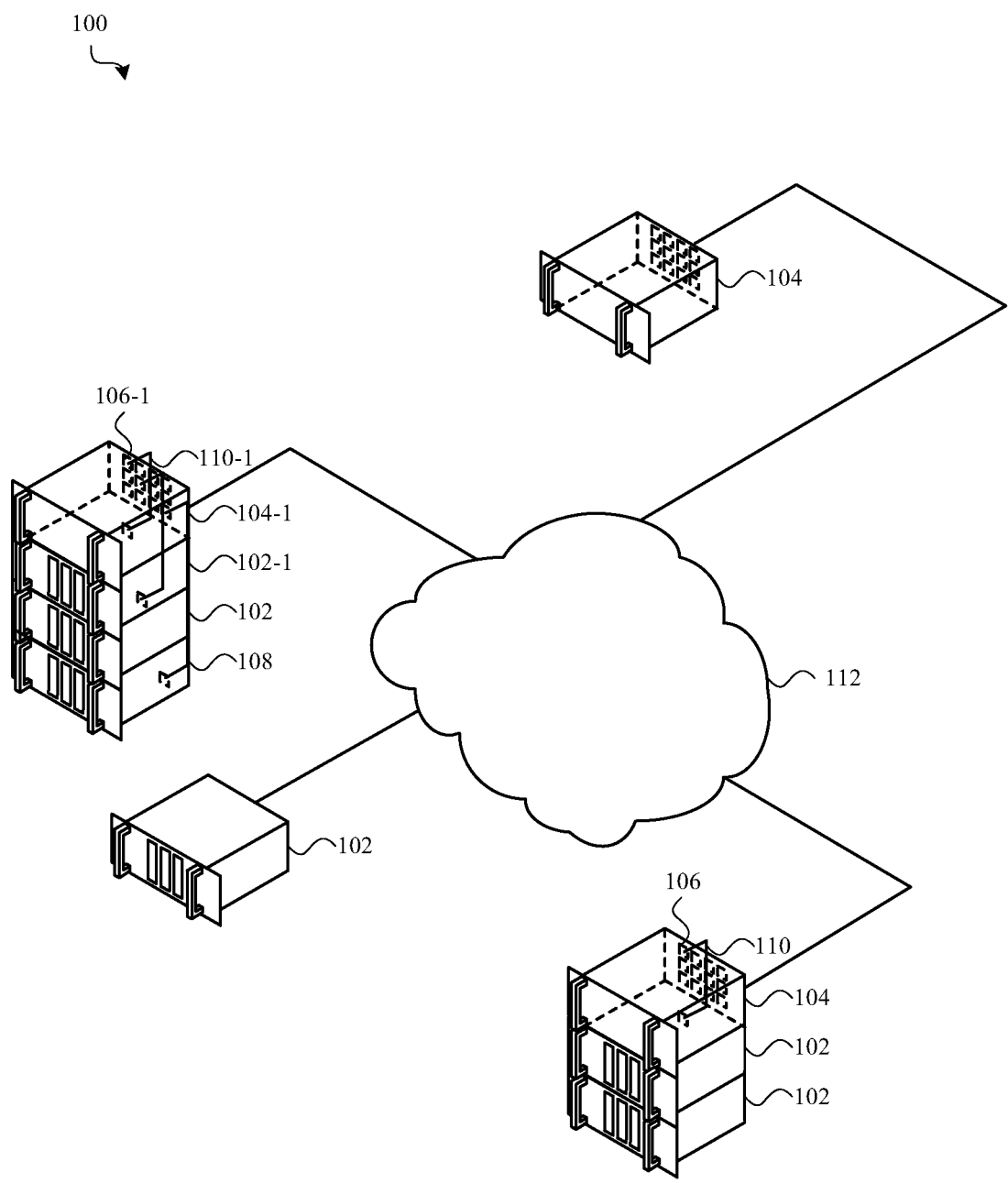
FIG. 1 shows an example network including a client device and a network device.

FIG. 1 shows an example network 100 including a client device 102-1 and a network device 104-1. In some embodiments, the network device 104-1 may be, or include, one or more of a switch (i.e., a network switch), a router (i.e., a network router), a hub, and so on. In some embodiments, the client device 102-1 may be, or include, a server. The client device 102-1 may alternatively be a desktop or laptop computer, a peripheral device (e.g., a scanner or copier), and so on.

The network device 104-1 may include a plurality of ports 106. The client device 102-1 may be connected to a port 106-1 of the network device 104-1, and may be one of multiple client devices 102 connected to the network device 104-1. Each client device 102 may be connected to a different port 106 of the network device 104-1 or, in some cases, two or more client devices 102 may be connected to a same port 106 in a multiplexed or wired-OR configuration. In some configurations, the network device 104-1 may be connected to one or more other network devices 104 and/or to a controller 108 via one or more of the ports 106.

In some embodiments, the client device 102-1 and network device 104-1 may be located in the same data center, along with other client devices 102 (e.g., servers), network devices 104 (e.g., switches), and other networked or non-networked components. In other embodiments, the client device 102-1 and network device 104-1 may be located in the same building, office, or equipment cabinet. In other embodiments, the client device 102-1 and network device 104-1 may be located more remote from one another (e.g., devices may be connected via one or more networks 112 (e.g., the Internet).

For purposes of explanation, the client device 102-1 and network device 104-1 will be further described in the context of an enterprise or data center environment. Those having ordinary skill in the art will understand how to apply the concepts, techniques, and configurations described herein to other environments.

In some scenarios, the client device 102-1 may be generally or specifically configured before it is connected to the network device 104-1. As part of generally configuring the client device 102-1, and by way of example, an operating system may be installed on the client device 102-1, and the client device 102-1 may be assigned an IP address and/or media access control (MAC) address. As part of specifically configuring the client device 102-1, and by way of example, the client device 102-1 may be configured as a database server (and in some cases a database may be loaded onto the client device 102-1), or a web server (and in some cases, the web pages of a website may be loaded onto the client device 102-1), or an email server (and in some cases, an email database may be loaded onto the client device 102-1). Regardless of whether the client device 102-1 is specifically or generally configured, applications, updates, and/or data may also be loaded onto the client device 102-1 after the client device 102-1 is connected to the network device 104-1.

Upon connection to the network device 104-1, powering and/or booting of the client device 102-1 (i.e., starting the client device 102-1), and enablement of the client device's network communications interface (if necessary), the client device 102-1 may transmit one or more communications (e.g., network packets). The communications may be transmitted over one or more network cables (or media) 110, and possibly through one or more other network devices, and received at the network device 104-1, at a port 106-1 of the network device 104-1.

The port 106-1 may have a physical port type, and may be configured to receive one or more types of network cables supported by the physical port type. For example, the port 106-1 may have a physical port type of Registered Jack-45 (RJ45), small form-factor pluggable (SFP), SFP+, SFP28, Quad SFP (QSFP), QSFP+, or QSFP28, or the port may be a combo port that encompasses different physical port types.

The port 106-1 may be configured to receive one or more types of network cable (or media). For example, the port 106-1 may be configured to receive one or more of a copper cable or a fiber cable (e.g., a fiber-optic cable).

In some cases, the port 106-1 may include, or be associated with, a sensor capable of detecting how the port 106-1 is configured or what type of network cable (or media type) is attached to the port 106-1. A sensor may also detect a media speed of the port 106-1 (e.g., 10, 100, or 1000 Gigabits/second (GBit/s). In some cases, the sensor may sense these parameters by means of a configuration switch position, by means of a physical analysis of a network cable 110-1, by means of reading information included in a tag or device attached to the network cable 110-1, or by means of transmitting or receiving network packets (e.g., test signals or communications) over the network cable 110-1 and assessing how the network cable 110-1 responds (e.g., a speed of transmission, delay, packet loss ratio, and so on).

In some embodiments, a processor internal to the network device 104-1 and/or a processor external to the network device 104-1, which may individually or collectively define a processing system of the network device 104-1, may determine a set of parameters of the client device 102-1. The parameters may be determined automatically or semi-automatically, and may include, for example, parameters of the physical configuration used to connect the client device 102-1 to the network device 104-1 (e.g., parameters of the port 106-1 or network cable 110-1), parameters obtained from the communications (e.g., network packets) received from the client device 102-1, and/or other parameters. The processing system may then align (e.g., automatically align) a network configuration used for the client device 102-1 with the set of parameters of the client device 102-1. In some cases, the network configuration may include a configuration of the network device 104-1 itself.

In some embodiments, the network device 104-1 may determine the set of parameters of the client device 102-1, and align the network configuration used for the client device 102-1, using one or more of policies, templates, hints, or heuristics. For example, in some embodiments, the processing system may attempt to match a set of parameters of the client device 102-1 to a template set of parameters in a template, which template references (e.g., specifies) a network configuration to be used for the client device 102-1.

In some embodiments, a set of templates may be provided to the network device 104-1, and the processing system may determine whether a set of parameters of the client device 102-1 matches a template set of parameters in one of the templates using IF/THEN/ELSE logic. For example, the processing system may compare the set of parameters of the client device 102-1 to a first template set of parameters in a first template, to determine whether there is a match. If the processing system determines that a match exists, a first network configuration referenced (e.g., specified) by the first template may be used for the client device 102-1. If the processing system determines that a match does not exist, the processing system may determine whether the set of parameters of the client device 102-1 matches a second template set of parameters in a second template, and so on. In some cases, the template matching process may end when a match is identified. In other cases, the template matching process may continue, to determine whether more than one match can be identified. When more than one match is identified, the processing system may identify a closest match and use the network configuration specified by the closest template for the client device 102-1. Alternatively, the processing system may trigger the transmission or execution of an alert, which alert may indicate that intervention is needed. The alert may include one or more of a text message, an email, an audible alert, a visible alert, a haptic alert, and so on. Upon receiving and evaluating the alert, an administrator may adjust the parameters associated with an existing template, to include the parameters of the client device 102-1, or the administrator may develop a new template including the parameters of the client device 102-1.

In some cases, a processing system may require an exact match between a set of parameters of the client device 102-1 and a template set of parameters before a match is declared. In other cases, a processing system may only require a match within a threshold match range. For example, if a particular percentage of the parameters match, or if at least particular parameters match, a match may be declared. Of note, the template set of parameters may in some cases include parameter ranges.

In some cases, a processing system may align a network configuration with a set of parameters of a client device 102-1 by attempting to match the full set of parameters to a template set of parameters. However, in some cases, a processing system may align a network configuration with a set of parameters of a client device 102-1 by subdividing the set of parameters into subsets of parameters and attempting to match a subset of the set of parameters to a template set of parameters. For example, the processing system may attempt to match a first subset of the set of parameters of the client device 102-1 to a template set of parameters. Upon determining a match, the processing system may attempt to match a second subset (or all) of the set of parameters to the template set of parameters, to confirm the match. Alternatively, if the first subset of the set of parameters is considered to sufficiently identify at least a portion of the client device's configuration, the processing system may proceed with alignment of a network configuration without confirmation. When the first subset of the set of parameters of the client device 102-1 does not match a template set of parameters included in a first template, the match process may continue with respect to a second template. By focusing on a subset of the set of parameters, the processing system may be able to eliminate non-matching templates from consideration quicker. Also, or alternatively, the processing system may be able to compare different subsets of the set of parameters of the client device 102-1 to different template sets of parameters, thereby enabling the alignment task to be subdivided into different contemporaneous or sequential tasks that may be able to be completed quicker.

In some cases, the processing system may continue a matching process after identifying a match between a set of parameters of the client device 102-1 and a template set of parameters. The match process may be continued to determine whether a set of parameters of a client device 102-1 matches more than one template set of parameters. This may occur, for example, when only a subset of parameters is being matched to a template set of parameters, or when the set of parameters that can be determined for the client device 102-1 is smaller than the set of parameters needed to uniquely match a template set of parameters.

The network configuration that is aligned with the set of parameters of the client device may include various items, such as an Ethernet configuration, to be used for the client device 102-1, a virtual local area network (VLAN) configuration, or a security configuration (e.g., an IP access list security configuration, firewall parameters, and so on). In some cases, the network configuration may include a role of the client device 102-1 inferred from the set of parameters. For example, the inferred role of the client device 102-1 may be that of a database server, a web server, or an email server, and the network configuration may include settings for the inferred role.

Although alignment of a network configuration with a set of parameters of a client device 102-1 has been described above with respect to a "start" of the client device 102-1, parameters of a client device may be determined, and a network configuration may be aligned to the parameters, at various times. For example, parameters may be determined, and the network configuration may be aligned, at initial setup of the client device 102-1, during an audit of the client device 102-1, or at other periodic, non-periodic, or event-driven times.

Figure 2:
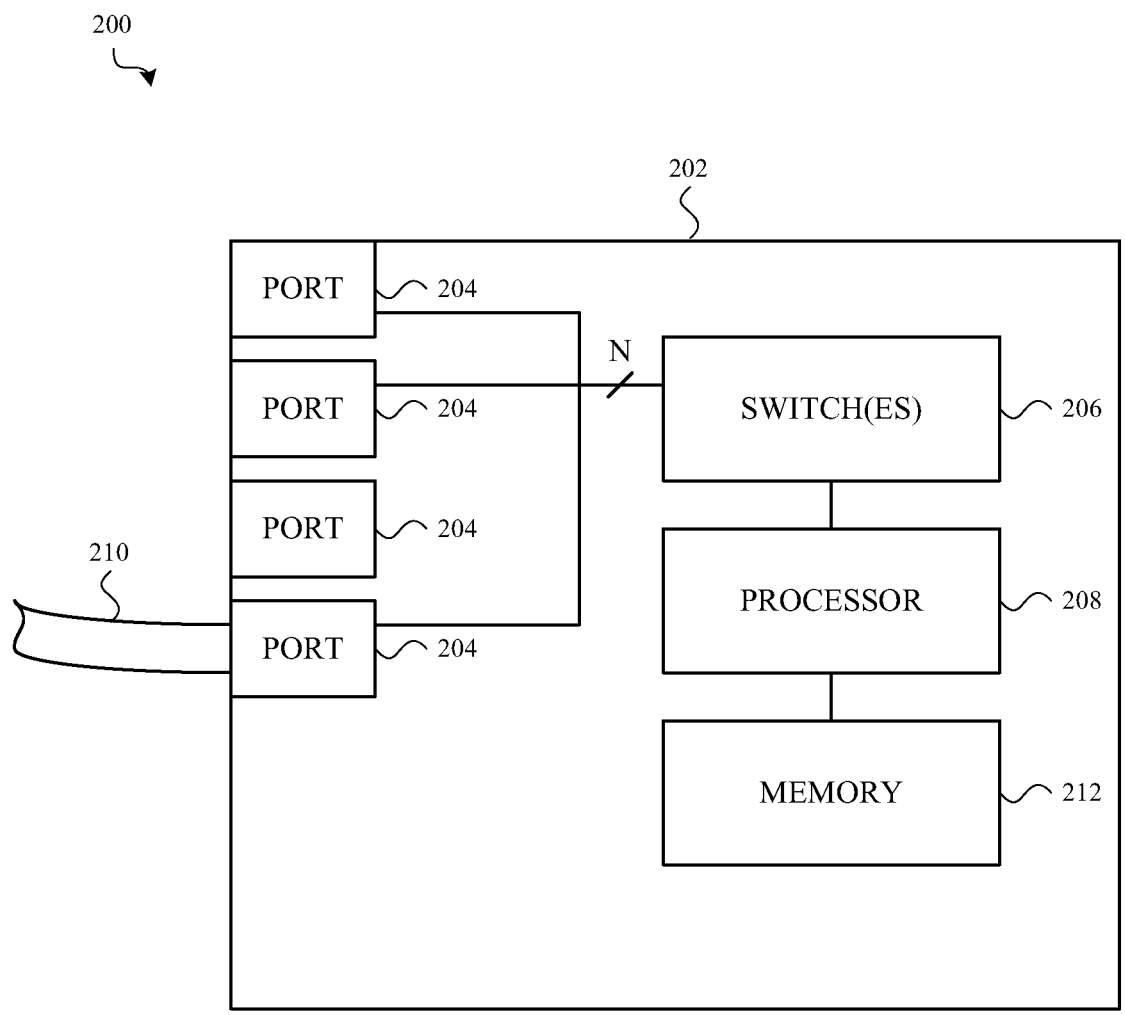
FIG. 2 shows an example block diagram of a network device.

FIG. 2 shows an example block diagram of a network device 200. The network device 200 may include a housing 202, a plurality of ports 204 (physical ports) mounted to the housing 202, at least one switch 206 (e.g., a switching network or switch block) mounted to the housing 202, and a processor 208. In some embodiments, the network device 200 may be, or include, one or more of a switch (i.e., a network switch), a router (i.e., a network router), a hub, and so on.

The housing 202 may be made of metal, plastic, or other materials, and in some cases may be configured for mounting in an equipment rack.

Each of the ports 204 may have a physical port type, and each port may be configured to connect to one or more types of network cable 210 that are supported by the physical port type. The ports 204 may have a common physical port type or different physical port types. Although a particular number of ports 204 are shown in FIG. 2, the network device 200 may include any number of ports 204. Each of the ports 204 may also have a port number, a logical port type, a logical port number, and/or other port parameters.

The one or more switches 206 may be configured to provide switchable connections between the ports 204 (e.g., connections between pairs or groups of the ports 204). The connections enable communications (e.g., network packets) to be transferred between the ports 204.

The processor 208 may be a singular processor of a processing system, or may be part of a distributed processing system including multiple processors. In the latter case, all of the processors may be mounted to the housing 202 (e.g., internal to the housing 202); or one or more of the processors may be mounted to the housing 202, and one or more of the processors may be remote from the network device 200 (e.g., external to the housing 202); or all of the processors may be remote from the network device 200. When the processing system is entirely remote from the network device 200, the processing system may be included within a device (e.g., a server or controller) that is connected to the network device 200 via a network cable connected to one of the network device's ports 204. When the processing system includes at least a first processor internal to the housing and a second processor external to the housing, the first processor may be configured to communicate with the second processor, and vice versa, via a port in the plurality of ports 204.

In some embodiments, the processor 208 (or processing system) may include one or more of a microprocessor, a controller, a microcontroller, and so on. The processor 208 may be implemented using one or more of an integrated circuit (IC), a discrete circuit, an application-specific integrated circuit (ASIC), a System-on-Chip (SoC), sets of logic gates, and so on. The processor 208 may access a memory 212 storing one or more instructions (or programs) that may be executed by the processor 208. In some cases, the memory 212 may also store a set of templates, each of which may include a template set of parameters associated with a respective network configuration. The memory 212 may be a singular memory, or may be a distributed or tiered memory. In some cases, the memory 212 may include a cache memory or other non-persistent memory, in combination with a long-term or other persistent memory. In some cases, part or all of the memory 212 may be located remote from the network device 200.

In operation, the processing system may be configured to operate the at least one switch, to provide different connections between the ports 204, and to transfer communications (e.g., network packets) between the ports 204 (e.g., from one port 204 to another port 204, or from one port 204 to many ports 204). The processing system may also be configured to receive, from a client device and via one of the ports 204, a set of communications (e.g., a set of network packets). The processing system may determine, at least in part from the set of communications, a set of parameters of the client device connected to the port 204, and align a network configuration used for the client device with the set of parameters of the client device.

The set of parameters of the client device may take various forms. In some embodiments, the set of parameters may include physical parameters, such as a physical port type of the port 204 to which the client device is connected, or a type of cable (e.g., a type of network cable) that connects the client device to the port. The parameters may also include a broadcast time interval or multicast time interval of the client device.

In some embodiments, the set of parameters of the client device may additionally or alternatively include an IP address of the client device, a MAC address of the client device, a logical address, and/or an IP address included in a DHCP request transmitted by the client device. These and other parameters may be determined at least partly from the set of communications (e.g., the set of network packets) received from the client device. For example, the processing system may parse the set of communications (e.g., read their meta data) to determine the IP address of the client device, the MAC address of the client device, and/or the IP address included in the DHCP request.

In some embodiments, the set of parameters of the client device may additionally include a geographic location of the client device or the network device 200, or a relative location of the client device or the network device 200. The geographic or relative location of the client device may be determined, in some cases, by the processing system parsing the communications received from the client device. The geographic or relative location of the network device 200 may be programmed into a memory of the network device 200. A relative location of a device may indicate, for example, whether the device is installed in a particular hall or rack of a data center.

As an example of how a network configuration may be aligned with a set of parameters of a client device, consider a server that is attached to a port of a network switch using 10-GbE SMF. Upon startup, the server transmits a DHCP request for IP version 4 (IPv4) address 192.0.2.10. The processing system of the network switch may infer that since the address 192.0.2.10 is being requested, the port to which the server is connected needs to be configured with configuration policies that align to the 192.0.2.10/24 IP subnet. This may include policies for Ethernet configuration, VLAN configuration, security configuration (e.g., an IP access list security configuration, firewall parameters, and so on), and all other configurations associated with this parameter (or hint).

In some cases, the processing system of the network switch may implement an IF/THEN/ELSE network configuration selection policy. For example, part of the selection policy may state:
IF DHCP REQUESTED ADDRESS=192.0.2.10 THEN APPLY PRE-CONFIGURED CONFIGURATION TEMPLATE ABC, ELSE . . . .

Because the port speed (or media speed) is 10-GbE and the network cable type is SMF, the processing system of the network switch may infer that Address Resolution Protocol (ARP) requests, an Ethernet MAC address, and so on can be used to select the correct network port configuration policy. Any other parameters of the server-to-network switch connection, that the processing system of the network switch can determine, can also be used to identify the correct network configuration to align with the server (or with the server's parameters).

As another example of how a network configuration may be aligned with a set of parameters of a client device, consider a server that is identified by a particular MAC address and IP address. After powering up and/or boot, the server may transmit an Ethernet frame and an IP packet. The Ethernet frame and/or IP packet may include hints that a network device can use to align a network configuration with the server. For example, the Ethernet frame may include the MAC address and IP address, and may be received at a port of a network device. The network device may use heuristics to determine, from the Ethernet frame, how the server is identifying itself (e.g., by a MAC address within a first range, and by an IP address within a second range). By using a template to determine how other servers using MAC and IP addresses within the first and second ranges are configured, the network device may transition the port to which the server is connected from 1) a neutral, default, or sensing configuration, to 2) a configuration associated with a template corresponding to the first and second ranges.

Figure 3:
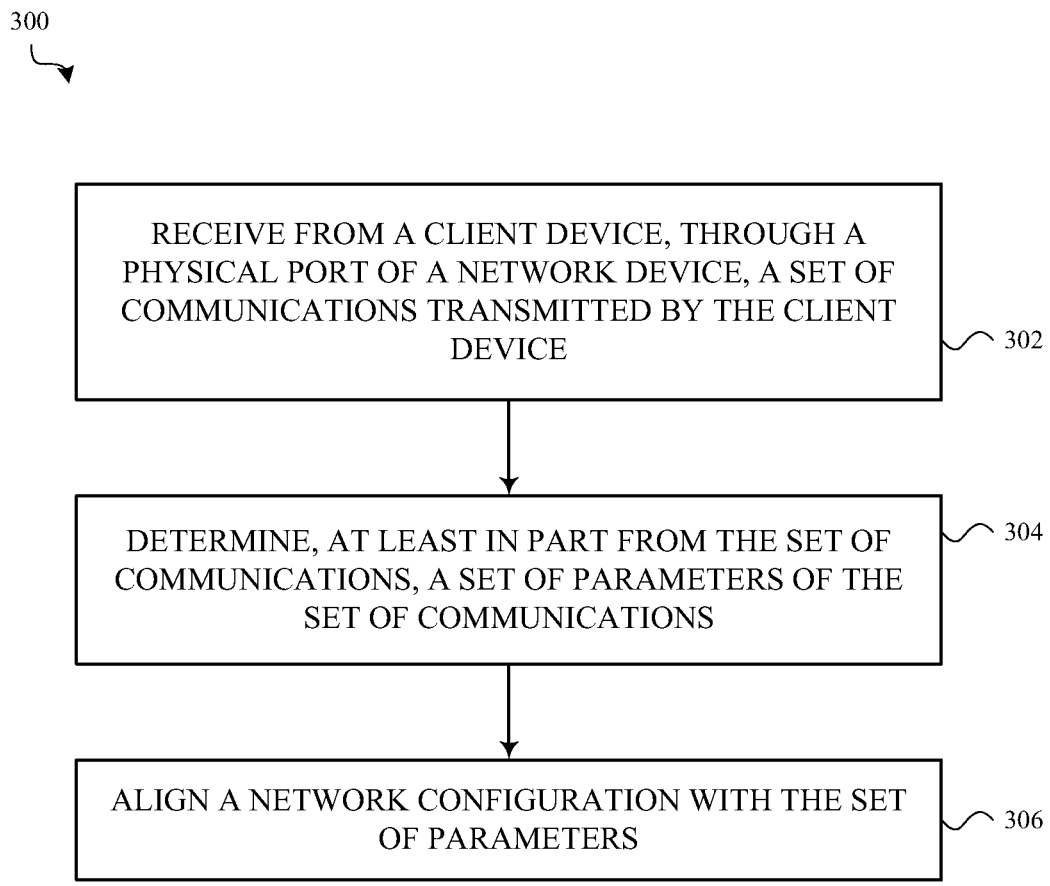
FIG. 3 shows an example method of aligning a network configuration to a set of parameters of a client device.

FIG. 3 shows an example method of aligning a network configuration to a set of parameters of a client device.

At block 302, the method 300 may include receiving from a client device, through a physical port of a network device, a set of communications transmitted by the client device.

At block 304, the method 300 may include determining, at least in part from the set of communications, a set of parameters of the set of communications.

At block 306, the method 300 may include aligning a network configuration with the set of parameters.

In some embodiments, determining the set of parameters may include parsing the set of communications and determining, from the parsing, at least one of an IP address of the client device, a MAC address of the client device, or an IP address included in a DHCP request of the client device.

In some embodiments, the order of operations in the method 300 may be performed in different orders or include more or fewer operations. In some embodiments, various operations of the method 300 may be performed contemporaneously or in parallel.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A network device, comprising:
   a housing;
   a plurality of ports mounted to the housing, each port having a physical port type, and each port configured to connect to a type of network cable supported by the physical port type;
   at least one switch mounted to the housing and configured to provide switchable connections between ports in the plurality of ports; and
   a set of one or more processors configured to,
      determine, at least partly from a set of network packets received via a port of the plurality of ports, a set of parameters of a client device, the set of parameters including,
         the physical port type of the port via which the set of network packets is received;
         the type of network cable connected to the port and sensed by the network device; and
         an Internet Protocol (IP) address included in a Dynamic Host Configuration Protocol (DHCP) request of the client device, the DHCP request included in the set of network packets; and
      align a network configuration used for the client device with the set of parameters of the client device.

2. The network device of claim 1, wherein the network configuration comprises a configuration of the network device.

3. The network device of claim 1, wherein the network device is a network switch.

4. The network device of claim 1, wherein:
   the set of one or more processors is configured to,
      parse the set of network packets and determine,
         the IP address included in the DHCP request; and
         at least one of an IP address of the client device or a media access control (MAC) address of the client device; and
   the set of parameters of the client device additionally includes at least the IP address of the client device or the MAC address of the client device.

5. The network device of claim 1, wherein:
   the set of one or more processors is configured to align the network configuration with the set of parameters of the client device by matching the set of parameters of the client device to a template set of parameters in a template; and
   the template specifies the network configuration.

6. The network device of claim 1, wherein the processing system is configured to determine the set of parameters of the client device using at least one of hints or heuristics.

7. The network device of claim 1, wherein:
   the set of one or more processors is configured to determine, at least in part from the set of network packets, at least one of:
      a geographic location of the client device; or
      a relative location of the client device; and
   the set of parameters of the client device additionally includes at least the geographic location or the relative location.

8. The network device of claim 1, wherein the set of one or more processors is mounted to the housing.

9. The network device of claim 1, wherein the set of one or more processors comprises:
   a first processor external to the housing; and
   a second processor internal to the housing; wherein,
   the first processor is configured to communicate with the second processor via a second port in the plurality of ports.

10. A network device, comprising:
    a plurality of physical ports; and
    a processor configured to,
       receive, via a physical port in the plurality of physical ports, a set of communications from a client device connected to the physical port;
       determine, at least in part from the set of communications, a set of parameters of the client device, the set of parameters including at least one of a physical port type of the physical port or a type of cable connected to the physical port; and
       align a network configuration used for the client device with the set of parameters of the client device.

11. The network device of claim 10, wherein:
    the processor is configured to align the network configuration with the set of parameters by,
       comparing the set of parameters to a template set of parameters in a template; and
       determining the set of parameters matches the template set of parameters; wherein,
       the network configuration is referenced by the template.

12. The network device of claim 11, wherein determining the set of parameters matches the template set of parameters comprises determining the set of parameters exactly matches the template set of parameters.

13. The network device of claim 11, wherein determining the set of parameters matches the template set of parameters comprises determining the set of parameters matches the template set of parameters within a threshold match range.

14. The network device of claim 11, wherein the set of parameters comprises an Internet Protocol (IP) address included in a Dynamic Host Configuration Protocol (DHCP) request received from the client device in the set of communications.

15. The network device of claim 10, wherein the network configuration comprises at least one of:
   an Ethernet configuration;
   a security configuration; or
   an internet protocol (IP) access list security configuration.

16. The network device of claim 10, wherein the network configuration comprises a role of the client device, the role including one of a database server, a web server, or an email server.

17. A method of aligning a network configuration to a set of parameters of a client device, comprising:
   receiving from the client device, through a physical port of a network device, a set of communications transmitted by the client device;
   determining, at least in part from the set of communications, the set of parameters of the set of communications, the set of parameters including at least one of a physical port type of the physical port or a type of cable connected to the physical port; and
   aligning the network configuration with the set of parameters.

18. The method of claim 17, wherein determining the set of parameters comprises:
   parsing the set of communications; and
   determining, from the parsing, at least one of,
      an Internet Protocol (IP) address included in a Dynamic Host Configuration Protocol (DHCP) request of the client device;
      an IP address of the client device; or
      a media access control (MAC) address of the client device.

19. The method of claim 17, wherein aligning the network configuration with the set of parameters comprises:
   attempting to identify the network configuration using a first subset of the set of parameters; and
   upon identifying a first network configuration associated with the first subset of the set of parameters, confirming that the first network configuration is associated with all of the parameters in the set of parameters of the client device.

\* \* \* \* \*